B. C. WHITE.
COTTON PICKER.
APPLICATION FILED OCT. 26, 1910.

1,003,836.

Patented Sept. 19, 1911.
2 SHEETS—SHEET 1.

WITNESSES:
F. E. Nares.
G. Blake

INVENTOR.
Bruce Clark White.
BY
Edward S. Beach
ATTORNEY.

B. C. WHITE.
COTTON PICKER.
APPLICATION FILED OCT. 26, 1910.

1,003,836.

Patented Sept. 19, 1911.

2 SHEETS—SHEET 2.

WITNESSES:

INVENTOR.
Bruce Clark White.
BY
ATTORNEY.

UNITED STATES PATENT OFFICE.

BRUCE CLARK WHITE, OF WOONSOCKET, RHODE ISLAND, ASSIGNOR TO PRICE-CAMPBELL COTTON PICKER CORPORATION, OF WILMINGTON, DELAWARE, A CORPORATION OF DELAWARE.

COTTON-PICKER.

1,003,836.     Specification of Letters Patent.     Patented Sept. 19, 1911.

Application filed October 26, 1910. Serial No. 589,243.

*To all whom it may concern:*

Be it known that I, BRUCE CLARK WHITE, citizen of the United States, residing at Woonsocket, in the county of Providence and State of Rhode Island, have invented certain new and useful Improvements in Cotton-Pickers, of which the following is a specification, reference being had therein to the accompanying drawings.

My invention relates to improvements in the devices which lift and gather the plants into position in advance of the picking.

It is especially applicable to cotton pickers having picking means extending into a middle picking space from each side and mounted on wheels and adapted to traverse a row of cotton plants, such as is shown in my pending application Serial No. 472,908, filed January 18, 1908, or in Campbell's Patent No. 542,794 of 1895.

One of the objects of my invention is to provide means for lifting stalks and stems which may have drooped to the ground or which may be so far inclined out of the row of plants that the picking mechanism would pass above them.

Another object of my invention is to so mount this plant-gathering device that it will swing laterally as the front wheels of the vehicle are swung in steering.

A further object of my invention is to provide for the vertical adjustment of these plant-gatherers.

Figure 1:
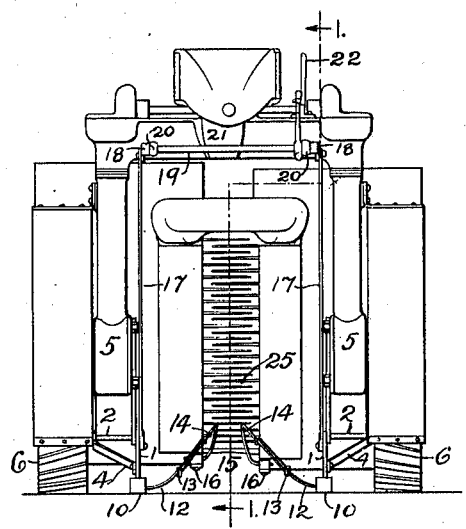
Figure 2:
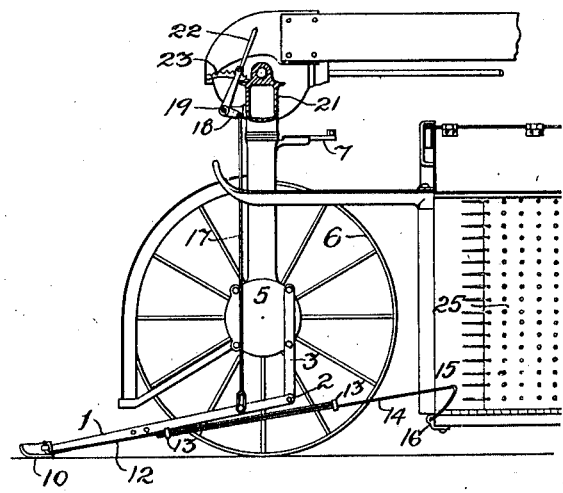
Figure 3:
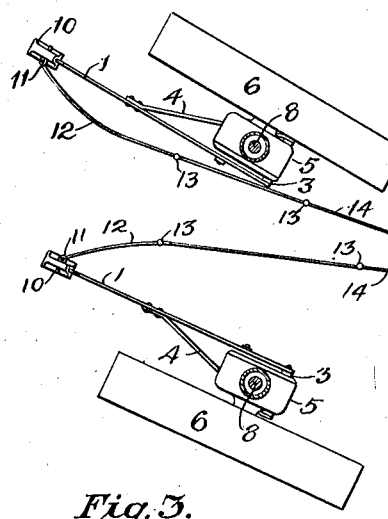
Figure 4:
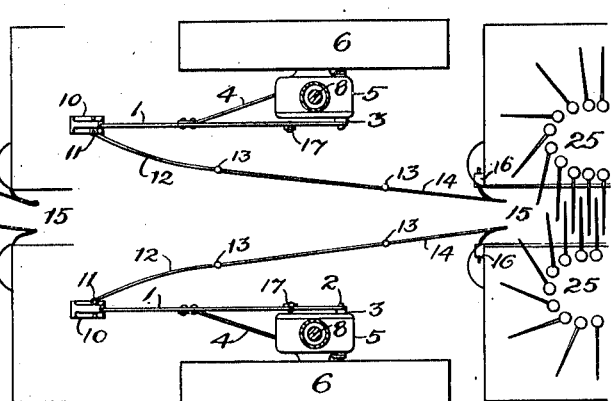
Figure 5:
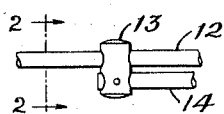
Figure 6:
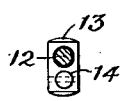
Figure 7:
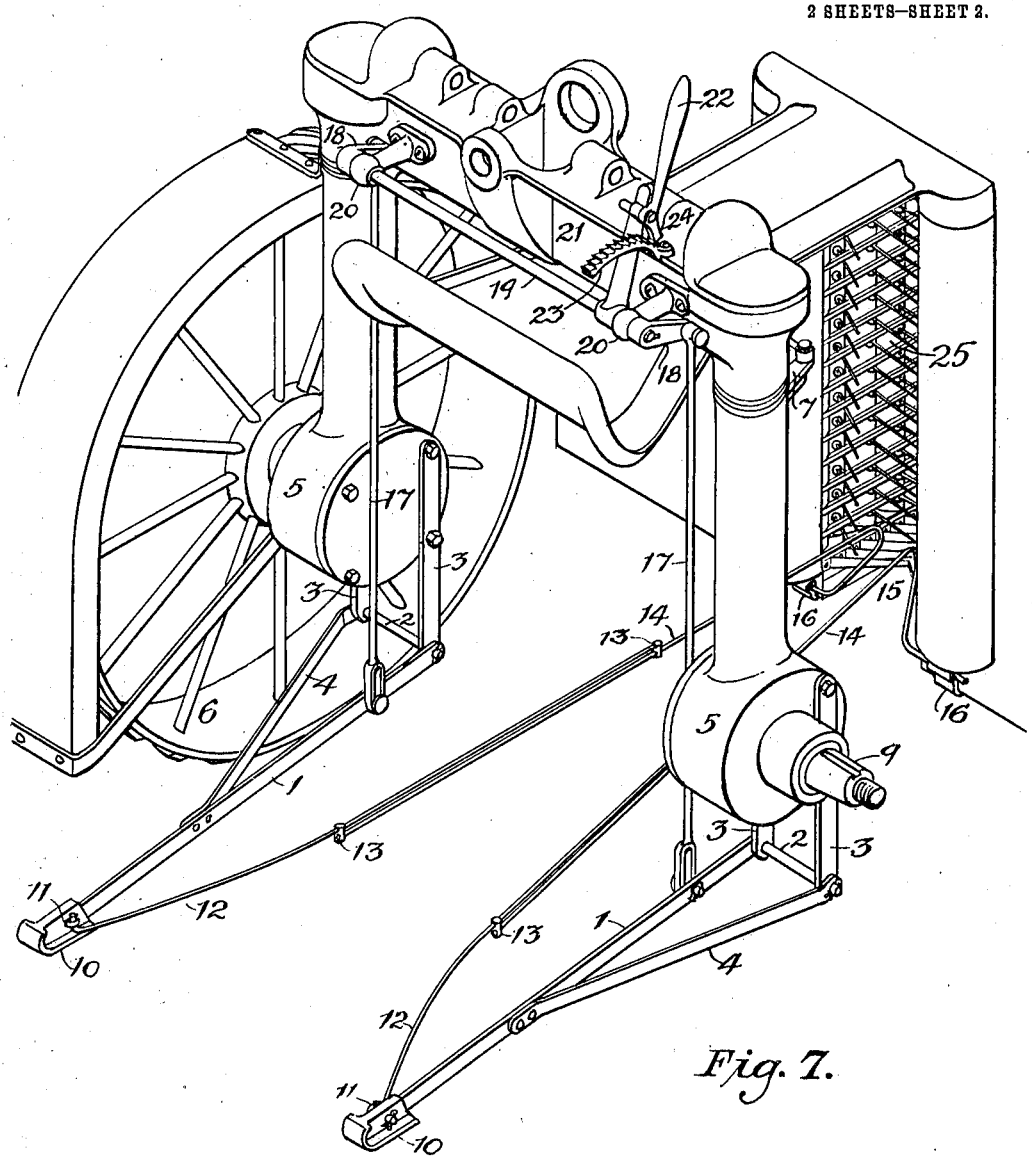

In the accompanying drawings, illustrating the principle of this invention and the best mode now known to me of applying that principle, Figure 1 is a front elevation of a cotton picker with plant gatherer attached. Fig. 2 is a longitudinal section on line 1—1 of Fig. 1. Fig. 3 is a plan view showing the front wheels and plant gatherer swung at an angle. Fig. 4 is a plan view showing the front wheels pointing straight ahead. Fig. 5 is a detail of the sliding connection of the plant-lifting rods. Fig. 6 is a section on line 2—2 of Fig. 5. Fig. 7 is a perspective view of the whole device mounted in the machine, one front wheel being removed.

Referring to the several figures of the drawings, in which like characters of reference indicate like parts, 1, 1 are bars pivotally mounted at their rear or inner ends through the pivot pins 2, 2, to the hangers 3, 3. Braces 4, 4, secured to the bars 1, 1, and pivotally mounted on the pins 2, 2, provide lateral stiffness to the bars 1, 1. The hangers 3, 3 are rigidly secured to parts 5, 5 upon which the front wheels 6, 6 are mounted, said parts being connected by arms 7, 7 to the steering gear. The parts 5, 5 are mounted upon the machine frame through vertical pivots 8, 8, upon which they turn as the front wheels are steered. The front wheels 6, 6 are mounted upon axles 9, 9, one of which is shown in Fig. 7 with the front wheel removed. The outer ends of the bars 1, 1 are each provided with a shoe 10, adapted to ride the ground at each side of a row of cotton plants.

Pivotally connected with the shoes 10, 10, through the eye bolts 11, 11, are light elastic rods 12, 12. These latter extend rearwardly, converging and inclining upwardly, and terminate in endwise sliding connections 13, 13, with rods 14, 14. The latter continue the rearward, upward and converging direction of the rods 12, 12, and extend to a point between the picking mechanisms 15, near the front lower corners thereof, thence bending downward, forward and finally outward, terminate in flexible connections 16, 16, one secured to each of the picking mechanisms. The rods 12, 12 lie close to the surface of the ground at their outer ends, and are adapted to pass under any cotton stalks or stems which may droop or lie close to the ground. Their rearward, upward and converging direction is adapted to straighten up such stalks or stems, compact the row of plants and deliver them into the picking space between the mechanisms in the most effective manner.

The sliding connection 13 between the rods 12 and 14 is shown in Figs. 5 and 6. It comprises a small block 13 fixed to the end of rod 12 and having an aperture through it through which rod 14 may slide freely endwise and parallel to rod 12. Rod 14 has a similar block 13 fixed to its end apertured to slide freely upon rod 12. By this means the lengthening or shortening of the distance from the shoe 10 to the picking mechanism 15 is provided for, and the rods 12 and 14 form a continuous support for the plant stalks. The rods 12 and 14 are preferably made of flexible elastic spring steel, in order that they may yield laterally when encountering stumps or heavy stalks.

The bars 1, 1, together with the rods 12 and 14, constituting a plant-raising mechanism, may be raised or lowered by means of the rods 17, 17, connected to the arms 18, 18 fixed to the cross shaft 19. This cross shaft is mounted in bearings 20, 20 secured to the machine frame 21. A handle 22, within reach of the operator, controls the vertical position of bars 1, 1. A notched quadrant 23 engaged by a pawl 24 on the handle enables the operator to adjust the bars 1, 1 at any desired elevation above the surface of the ground or to raise them clear of obstacles when necessary.

The shoes 10, 10 are preferably in full view of the operator, thereby materially assisting him in steering the machine. The sliding connections between the rods 12 and 14 and their pivotal connections to the shoes 10 and picking mechanisms 25 permit the latter to be raised and lowered without changing the vertical adjustment of the bars 1, 1. The flexibility of the rods 12 and 14, together with their pivotal and sliding connections, permit either of the picking mechanisms 25 to be moved outwardly or crosswise of the machine, to give access between them, without disturbing the plant-gathering device.

When turning the machine about at the end of the row of cotton plants and directing or steering it on to the beginning of another row, the shoes 10 may take their proper position on either side of the plants, as their position and direction are determined by the position and direction of the front wheels, instead of by the general position of the machine as a whole, which at this time may stand at a considerable angle to the row of cotton plants upon which the machine is entering.

My improvements may be embodied in other forms of apparatus without departure from my invention.

I do not herein make any claim relating to any adjustment of the picking mechanisms, as such matter is set forth in application Serial No. 589,260, filed October 26, 1910.

What I claim and desire to secure by Letters Patent is:—

1. In a cotton picker having a central passage and picking mechanism therein supported by a wheeled vehicle, the front wheels of which are mounted pivotally for steering, the combination of a steering mechanism with a picking mechanism and a plant-raising apparatus comprising forwardly extending bars attached to the steered element of the front wheel mountings and rods extending from the front end of said bars rearward to the said picking mechanism.

2. In a cotton picker, plant-lifting bars spaced laterally apart and extending forward from the front wheel mountings and steered therewith; flexible rods pivotally connected with the said plant-lifting bars and with the picking mechanism; in combination with front wheel mountings, a steering mechanism and picking mechanism.

3. The combination of plant-lifting bars spaced laterally apart and extending forwardly from the axles of the steerable front wheels of a cotton picker; said axles; and plant-lifting rods spaced laterally apart and severally extending rearward from the forward end of each of said lifting-bars, said lifting-rods each having an endwise sliding connection with a connecting rod extending forward from each of a pair of cotton picking mechanisms; said connecting rods and picking mechanisms.

In testimony whereof I have affixed my signature in presence of two witnesses.

BRUCE CLARK WHITE.

Witnesses:
EDWARD S. BEACH,
F. E. NARES.